United States Patent
Fiala

(10) Patent No.: US 9,546,438 B2
(45) Date of Patent: Jan. 17, 2017

(54) LOW Z HIGH PERFORMANCE CARBON COMPOSITE MATERIALS

(71) Applicant: GOODRICH CORPORATION, Charlotte, NC (US)

(72) Inventor: Robert Fiala, Spokane, WA (US)

(73) Assignee: Goodrich Corporation, Charlotte, NC (US)

( * ) Notice: Subject to any disclaimer, the term of this patent is extended or adjusted under 35 U.S.C. 154(b) by 71 days.

(21) Appl. No.: 14/694,270

(22) Filed: Apr. 23, 2015

(65) Prior Publication Data
US 2016/0312390 A1    Oct. 27, 2016

(51) Int. Cl.
| D04H 1/4242 | (2012.01) |
| D04H 1/48 | (2012.01) |
| D01F 9/22 | (2006.01) |
| D06C 15/10 | (2006.01) |

(52) U.S. Cl.
CPC ............ *D04H 1/4242* (2013.01); *D01F 9/225* (2013.01); *D04H 1/48* (2013.01); *D06C 15/10* (2013.01)

(58) Field of Classification Search
CPC .......... D04H 1/4242; D04H 1/46; D04H 1/48; D04H 1/498; D04H 18/02; B32B 2262/106; F16D 69/023; B01J 20/20; D06C 15/10
USPC ................... 28/107, 112, 115; 264/29.1, 29.2
See application file for complete search history.

(56) References Cited

U.S. PATENT DOCUMENTS

| 3,772,115 A * | 11/1973 | Carlson .................. C04B 35/83 156/148 |
| 3,867,491 A | 2/1975 | Marin |
| 3,994,762 A * | 11/1976 | Wrzesien ................ B29C 70/24 156/148 |
| 5,264,162 A | 11/1993 | Salem et al. |
| 5,433,937 A | 7/1995 | Sohda et al. |
| 5,503,893 A * | 4/1996 | Evans ..................... B29C 70/24 244/110 A |
| 5,599,603 A * | 2/1997 | Evans ...................... B32B 1/08 188/250 C |
| 5,664,305 A * | 9/1997 | Lawton .................... D04H 1/46 28/107 |
| 6,183,583 B1 * | 2/2001 | Duval ..................... C04B 35/83 156/148 |
| 6,237,203 B1 * | 5/2001 | Sheehan ................ B29B 11/04 28/107 |
| 6,248,417 B1 * | 6/2001 | Ponsolle .................. B32B 5/26 28/107 |
| 6,767,602 B1 * | 7/2004 | Duval ..................... C04B 35/83 156/148 |
| 8,060,997 B2 * | 11/2011 | Wall, III .................. B32B 5/06 28/107 |

(Continued)

FOREIGN PATENT DOCUMENTS

JP        1-203267 A   *   8/1989

*Primary Examiner* — Amy Vanatta
(74) *Attorney, Agent, or Firm* — Snell & Wilmer L.L.P.

(57) ABSTRACT

A carbon/carbon part and processes for making carbon/carbon parts are provided. The process involves forming steps, carbonization steps and densification steps. The forming steps may include needling fibrous layers to form fibers that extend in three directions. Pressure may be applied to a fibrous preform at an elevated temperature to increase the fiber volume ratio of the fibrous preform. The densification steps may include filling the voids or pores of the fibrous preform with a carbon matrix.

15 Claims, 9 Drawing Sheets

(56) References Cited

U.S. PATENT DOCUMENTS

| | | | |
|---|---|---|---|
| 2005/0178327 A1* | 8/2005 | Rudolph | C23C 16/045 |
| | | | 118/715 |
| 2006/0177663 A1* | 8/2006 | Simpson | C04B 35/6267 |
| | | | 428/408 |
| 2007/0186396 A1* | 8/2007 | Linck | C04B 35/645 |
| | | | 28/112 |
| 2010/0293769 A1* | 11/2010 | La Forest | C04B 35/83 |
| | | | 28/108 |
| 2011/0083305 A1* | 4/2011 | La Forest | C04B 35/83 |
| | | | 28/112 |
| 2013/0248305 A1 | 9/2013 | Choi et al. | |

* cited by examiner

LOW Z HIGH PERFORMANCE CARBON COMPOSITE MATERIALS

FIELD

The present disclosure relates generally to the manufacture of composite materials and parts. More particularly, the disclosure relates to a method and system for fabricating an ultra low z carbon preform that is compressed and carbonized.

BACKGROUND

Carbon/carbon ("C/C") parts are employed in various industries. An exemplary use for C/C parts includes using them as friction disks such as aircraft brake disks, race car brake disks, clutch disks, and the like. C/C brake disks are especially useful in such applications because of the superior high temperature characteristics of C/C material. In particular, the C/C material used in C/C parts is a good conductor of heat and thus is able to dissipate heat away from the braking surfaces that is generated in response to braking. C/C material is also highly resistant to heat damage, and is thus capable of sustaining friction between brake surfaces during severe braking, without a significant reduction in the friction coefficient or mechanical failure.

SUMMARY

According to various embodiments, a method for forming a fibrous preform is described herein. The method may include superposing a first fibrous layer aligned in a machine direction with an additional fibrous layer aligned in an acute angle to the machine direction, needling the first fibrous layer and the additional fibrous layer together at a needle density of between approximately 60 and 65 needle punches per square centimeter to form a first combined fibrous mat, superposing an additional combined fibrous mat with the first combined fibrous mat, needling the first combined fibrous mat and the additional combined fibrous mat at a needle density of between approximately 45 and 55 needle punches per square centimeter to form the fibrous preform comprising oxidized polyacrylonitrile (OPF) fibers extending in multiple directions and having pores extending therethrough wherein a fiber volume ratio of the fibrous preform is between about 30% fiber volume and about 35% fiber volume, compressing the fibrous preform, and carbonizing the fibrous preform by heating the fibrous preform to convert fibers of the fibrous preform into carbon fibers, wherein the fiber volume ratio of the fibrous preform after the carbonizing is between about 20% to 24% fiber volume. The step of compressing the fibrous preform may comprise applying a mechanical pressure to the fibrous preform during carbonizing to compress a thickness of the fibrous preform. Alternatively, the step of compressing the fibrous preform may comprise applying a mechanical pressure to the fibrous preform prior to carbonizing to compress a thickness of the fibrous preform at a temperature less about 200° C. The method may further comprise densifying the fibrous preform by depositing a carbon matrix within at least a portion of the pores. The additional fibrous layer may be at an angle between approximately 30 and 70 degrees to the machine direction. The step of superposing may comprise superposing at least two additional fibrous layers with the first fibrous layer at two separate acute angles to the machine direction. The first fibrous layer may be needled prior to the superposing with the additional fibrous layer.

According to various embodiments, the method may include needling a first fibrous layer and an additional fibrous layer together at a needle density of between approximately 60 and 65 needle punches per square centimeter to form a first combined fibrous mat, needling the first combined fibrous mat and an additional fibrous mat at a needle density of between approximately 45 and 55 needle punches per square centimeter to form the fibrous preform, applying mechanical pressure to the fibrous preform prior to a carbonization step to compress a thickness of the fibrous preform thereby increase a fiber volume ratio of the fibrous preform, and carbonizing the fibrous preform in a furnace by heating the fibrous preform to convert the fibers into substantially carbon fibers, wherein the fiber volume ratio of the fibrous preform after the carbonizing is between about 20% and 24% fiber volume. The mechanical pressure may be applied at less than 200° C. Further, the mechanical pressure may be applied for a time period between about 90 and 180 minutes. The mechanical pressure may also be applied along a direction of a plurality of z-fibers via a mechanical platen press. The mechanical platen press may generate a compressive force of between 10 and 60 psi on the fibrous preform. The method may further comprise densifying the fibrous preform by depositing a carbon matrix within at least a portion of pores of the fibrous preform. At least one of the first fibrous layer and the additional fibrous layer comprises oxidized polyacrylonitrile (OPF). A fiber volume ratio of the fibrous preform before applying the mechanical pressure may be between about 30% fiber volume and about 35% fiber volume.

BRIEF DESCRIPTION OF DRAWINGS

The present disclosure may be better understood with reference to the following drawing figures and description. Non-limiting and non-exhaustive descriptions are described with reference to the following drawing figures. The components in the figures are not necessarily to scale, emphasis instead being placed upon illustrating principles. In the figures, like referenced numerals may refer to like parts throughout the different figures unless otherwise specified.

DETAILED DESCRIPTION

Figure 1:
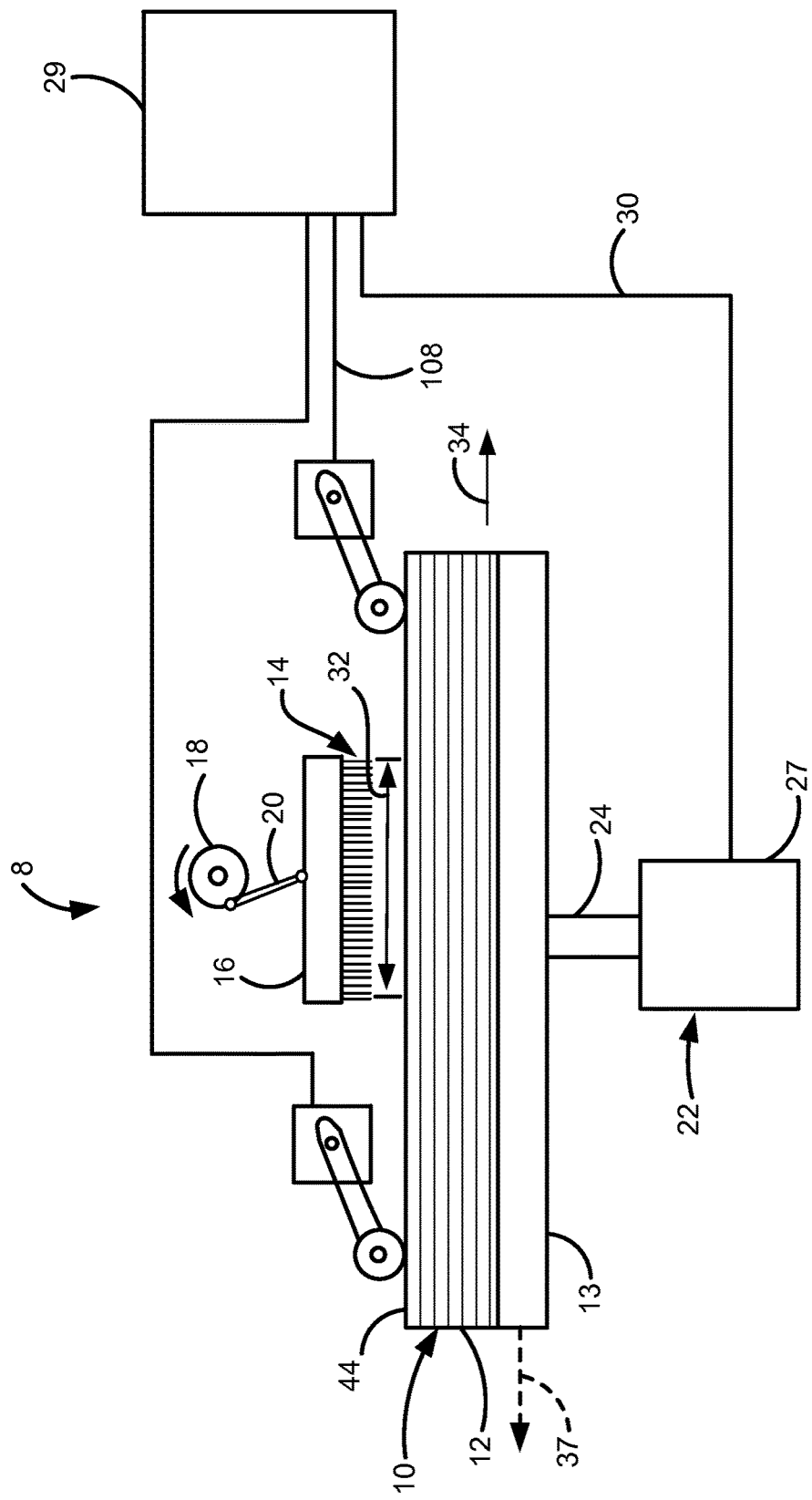
FIG. 1 illustrates needling apparatus according to various embodiments.

The detailed description of various embodiments herein makes reference to the accompanying drawing figures, which show various embodiments and implementations thereof by way of illustration and its best mode, and not of limitation. While these embodiments are described in sufficient detail to enable those skilled in the art to practice the embodiments, it should be understood that other embodiments may be realized and that logical and mechanical changes may be made without departing from the spirit and scope of the disclosure. Furthermore, any reference to singular includes plural embodiments, and any reference to more than one component or step may include a singular embodiment or step.

Also, any reference to attached, fixed, connected or the like may include permanent, removable, temporary, partial, full and/or any other possible attachment option. Additionally, any reference to without contact (or similar phrases) may also include reduced contact or minimal contact. Finally, though the various embodiments discussed herein may be carried out in the context of an aircraft, it should be understood that systems and methods disclosed herein may be incorporated into anything needing a brake or having a wheel, or into any vehicle such as, for example, an aircraft, a train, a bus, an automobile and the like.

Carbon/carbon parts ("C/C") in the form of friction disks are commonly used for aircraft brake disks and race car brake and clutch disks. Carbon/carbon brake disks are especially useful in these applications because of the superior high temperature characteristics of C/C material. In particular, the carbon/carbon material used in C/C parts is a good conductor of heat and is able to dissipate heat generated during braking away from the braking surfaces. Carbon/carbon material is also highly resistant to heat damage, and thus, is capable of sustaining friction between brake surfaces during severe braking without a significant reduction in the friction coefficient or mechanical failure.

In general, there are currently two primary methods of manufacturing C/C materials. The first method involves the layup and cure of a carbon fiber, phenolic resin matrix composite, followed by pyrolysis and subsequent phenolic resin infiltration and pyrolysis cycles. Multiple resin infiltration and pyrolysis cycles are typically used until the part achieves the desired density. The second method involves fabrication of an oxidized PAN or carbon fiber preform, followed by carbonization and chemical vapor infiltration (CVI) densification. The chemical vapor infiltration cycles are continued, in conjunction with machining the preform between infiltration cycles if desired, until the desired part density is achieved. Combinations of these two basic process methods are also in use and may include variations in preform architecture, infiltration resin type, and chemical vapor infiltration conditions.

In general, C/C parts produced using the oxidized PAN fiber, carbonization, and CVI densification method are made in three successive manufacturing steps. First, a fibrous preform is made utilizing a variety of textile manufacturing techniques. Typically, the fibrous preform is made from oxidized polyacrylonitrile (PAN) fiber ("OPF"). Although numerous techniques are known in the art for making fibrous preforms from OPF, a common technique involves stacking layers of OPF to superimpose the layers. The added layers may then be needled perpendicularly to the layers with barbed, textile needles. The needing process generates a series of z-fibers through the fibrous preform that extend perpendicularly to the fibrous layers. The z-fibers are generated through the action of the needles pushing fibers from within the layer (x-y or in-plane) and reorienting them in the z-direction (through-thickness). Needling of the fibrous preform may be done as one or more layers are added to the stack or may be done after the entire stack is formed. The needles may also penetrate through only a portion of the preform or may penetrate through the entire preform. In addition, resins are sometimes added to the fibrous preform by either injecting the resin into the preform following construction or coating the fibers or layers prior to forming the fibrous preform.

After the fibrous preform is made, it is carbonized to convert the OPF into carbon fibers. Typically, fibrous preforms are carbonized by placing the preforms in a furnace with an inert atmosphere. As well-understood by those in the art, the heat of the furnace causes a chemical conversion which drives off the non-carbon chemical species from the preform. The resulting preform generally has the same fibrous structure as the fibrous preform before carbonizing. However, the OPF have been converted preferably to almost 100% carbon. After the preform has been carbonized, the preform is densified. In general, densification involves filling the voids, or pores, of the fibrous preform with additional carbon material. This may be done using the same furnace used for carbonization or a different furnace. Typically, chemical vapor infiltration and deposition ("CVI/CVD") techniques are used to densify the porous fibrous preform with a carbon matrix. This commonly involves heating the furnace and the carbonized preforms, and flowing hydrocarbon gases into the furnace and around and through the fibrous preforms. As a result, carbon from the hydrocarbon gases separates from the gases and is deposited on and within the fibrous preforms. When the densification step is completed, the resulting C/C part has a carbon fiber structure with a carbon matrix infiltrating the fiber structure, thereby deriving the name "carbon/carbon".

Referring now to the drawings, and particularly to FIG. 1, a schematic diagram is shown of a needling operation that may be used to form a fibrous preform 10 in accordance with various embodiments. Typically, the fibrous preform 10 is formed by superimposing a number of fibrous layers 12 on top of each other. The fibrous layers 12 are usually made from OPF. The fibrous layers 12 may be made in a variety of ways and may include discrete (staple) or continuous fibers, unidirectional or cross-layered fibers or braided structures. The fibrous layers 12 may also be preprocessed in various ways, such as pre-needling processes, to make the fibrous layers more coherent.

Preferably, the fibrous layers 12 are placed on top of each other one-by-one. After each fibrous layer 12 is placed on top of the stack 44 of fibrous layers 12, the stack 44 is needled with a needling head 16. Numerous types of needling techniques are possible. However, as shown, most needling processes include a needling head 16 that moves up and down in a reciprocating manner. A drive mechanism, such as a rotating wheel, and an off-center connecting rod 20 may be used to accomplish the desired reciprocating motion. A plurality of needles 14, such as barbed needles, face the stack 44 of fibrous layers 12 and penetrate the fibrous layers 12 as the needling head 16 strokes downward. As a result, the barbs of the needles 14 push fibers from one fibrous layer 12 to the next fibrous layer 12 to form z-fibers that extend perpendicularly across the fibrous layers 12. Needling pulls fibers from the in-plane direction and forces them into the z-fiber direction, thus decreasing in-plane fiber content which may reduce high-energy friction performance and in-plane mechanical strength in the final composite. In general, the needling process has the effect of interlocking the individual fabric layers together. Thus, after needling, the fibrous preform 10 has fibers extending in three different directions (i.e., in the x and y directions in the plane of the fibrous layers 12 and the z direction perpendicular to the fibrous layers 12). The entire surface of the stack 44 of fibrous layers 12 may be needled by moving the support 13 back-and-forth or the needling head 16 may be repositioned along the surface of the stack 44. Preferably, the needles 14 only penetrate a portion of the fibrous layers 12 with each down stroke without penetrating through the entire stack 44 of fibrous layers 12, except when the bottom layers in the stack 44 are needled.

With continued reference to FIG. 1 according to various embodiments, a fibrous preform 10 is shown in the process of being formed in apparatus 8. The fibrous preform 10 is disposed on a bedplate or support 13 beneath a multitude of needles 14 mounted in a needling head 16. Support 13 is penetrable by the needles 14, and may be formed from a penetrable material such as foamed plastic or brush bristles, or a bedplate with holes aligned with the needles 14 to allow penetration. A "stripper" plate may be disposed above the support 13 configured to strip fibers away from the needles during operation. Fibrous preform 10 is comprised of fibrous layers 12 with a top layer defining an exposed surface 45 (see FIG. 2). The fibrous preform 10 is then subjected to a needling pass in which the multitude of felting needles 14 are repeatedly driven into the fibrous preform 10 through exposed surface 45 as the fibrous preform 10 is passed beneath the felting needles in the direction of arrow 34. As used herein, the term "fibrous structure" refers to all the fibrous layers disposed on the support 13 beneath the felting needles 14 during a given needling pass. Layers may be added to the fibrous structure at one or more needling passes, but it is not necessary to add a fibrous layer to the fibrous structure at every needling pass.

The felting needles 14 are arranged in an array as is known in the art. Other types of needling devices or boards commonly known in the art are also acceptable. Several rows may be arranged parallel to each other so the entire width of the fibrous preform 10 may be subjected to needling with each needling pass. The array of felting needles 14 defines a needling zone 32.

The felting needles 14 are driven by means of a drive mechanism 18 that drives needling head 16 through a fixed range of travel in a reciprocating motion. The multitude of felting needles thereby displace fibers among layers of the fibrous preform 10 producing "Z-fiber" bundles that pass between layers generally perpendicular to the layer interfaces. Additional layers are disposed over previous layers and subjected to additional needling passes which adheres the additional layers to the previous layers. Additional layers are added until a final desired thickness is established. The fibrous preform 10 may then be subjected to further needling passes without adding additional layers. The finished fibrous preform 10 can be processed in subsequent operations, in known manner, as previously described.

A support adjustment mechanism 22 adjusts the support position relative to the multitude of felting needles 14 in a manner well known in the art. Here, the support adjustment mechanism comprises jackscrew and motor/gearbox 27. A controller 29 controls the support adjustment mechanism 22 via control line 30 as desires in order to precisely position the support 13 relative to the multitude of felting needles 14. The fibrous preform 10 may be driven by means of a conveyor in the direction of arrow 34 such that the multitude of felting needles may be repeatedly driven into the exposed surface 45 along the length of fibrous preform 10. The fibrous preform 10 and conveyor may be subsequently driven in the direction of arrow 37, thereby needling the fibrous preform structure in the opposite direction. Also, the fibrous preform 10 and conveyor may be continuously driven as the needles are driven into fibrous preform 10, or the fibrous preform 10 and conveyer may be synchronized with drive mechanism 18 such that the conveyor momentarily stops or travels in an elliptical path when the needles 14 are driven into fibrous preform 10. Any such variations are considered to be within the scope of this disclosure. Also, the various components of apparatus 8 may be oriented in various ways without departing from the invention. For example, apparatus 8 could be rotated onto a side or even inverted if a particular application desired such an arrangement.

Figure 2:
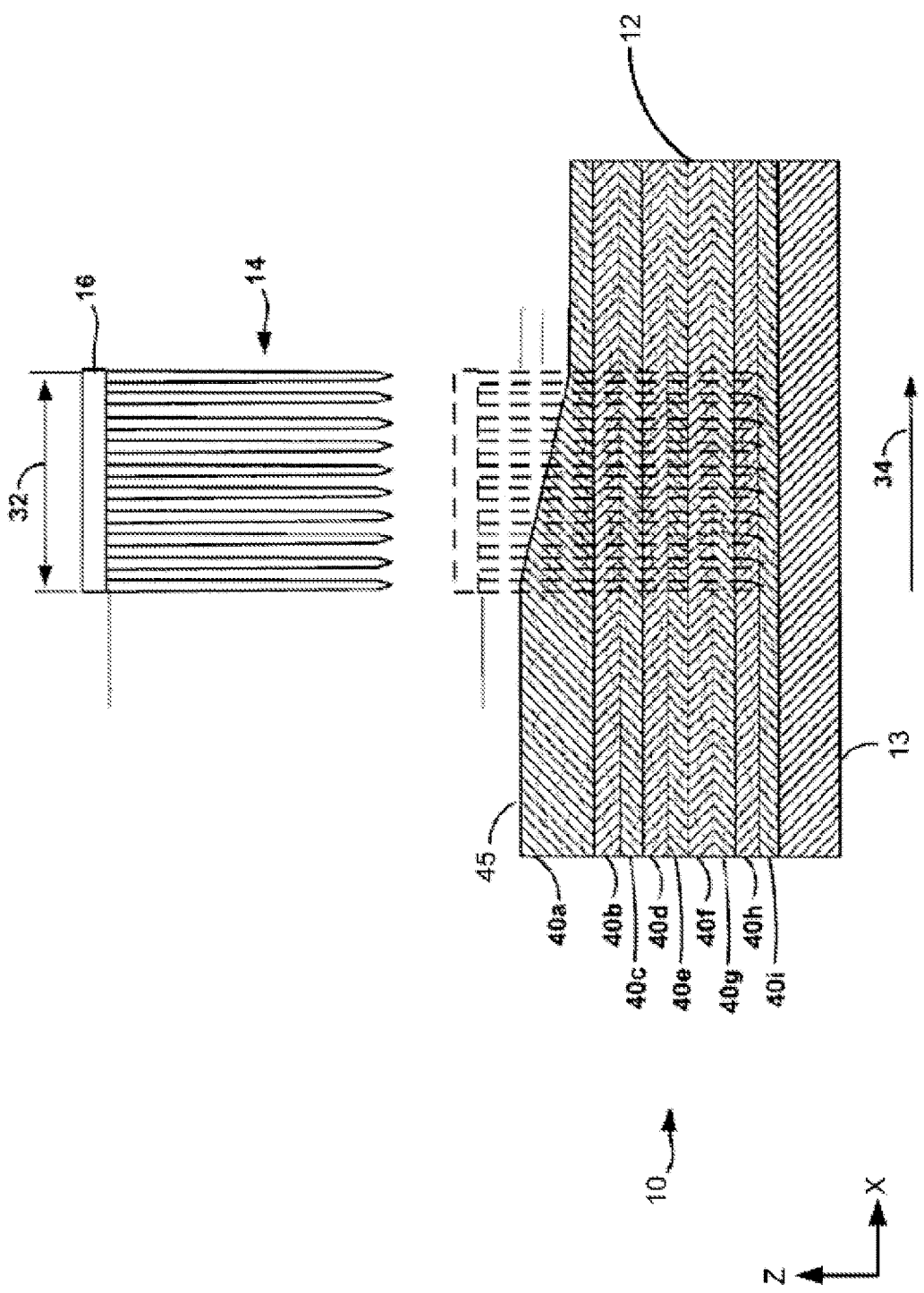
FIG. 2 illustrates a detailed view of a needling process via the needling apparatus of FIG. 1, in accordance with various embodiments.

As shown in FIG. 2, a fibrous preform 10 in accordance with various embodiments comprising at least two fibrous layers 40a-40i is disposed beneath the multitude of felting needles 14 on support 13. As depicted, the fibrous preform 10 may comprise a multitude of superposed fibrous layers 12. According to various embodiments, the superposing of the at least one additional fibrous layer is performed by cross-lapping. The direction of alignment of the at least one additional fibrous layer may be at an angle between approximately 30 and 70 degrees to the machine direction. The superposing may comprise superposing at least two additional fibrous layers with the first fibrous layer at two separate acute angles to the machine direction. The first fibrous layer may be needled prior to the superposing with the at least one additional fibrous layer.

A top layer 40a is disposed over lower adjacent layers 40b, 40c, 40d, 40e, 40f, 40g, 40h, and 40i with the top layer 40a defining an exposed surface 45. In this example, top layer 40a is not adhered to layer 40b until it is subjected to a needling pass in which layers 40a-40i are passed beneath the multitude of felting needles 14 while the multitude of felting needles 14 are repeatedly driven through the exposed surface 45 into the fibrous preform 10, as shown in phantom, deep enough to permanently transport fiber from layer 40a into lower adjacent layer 40b. The needling pass adheres top layer 40a to layer 40b by permanently transporting fiber from the top layer 40a into layer 40b and other lower adjacent layers.

Fiber is permanently transported from a chosen set of layers for each needling pass. The set of layers may change from one needling pass to the next. Choosing the set of layers is a matter of preform design according to desired final preform properties. The set of layers includes at least the top layer 40a. According to various embodiments, the set of layers preferably includes the top layer 40a and at least one adjacent layer 40b. In another embodiment, the set of layers preferably includes the top layer 40a and at least two adjacent layers 40b and 40c. In the example shown, layers could include more than three layers in many applications.

Figure 3:
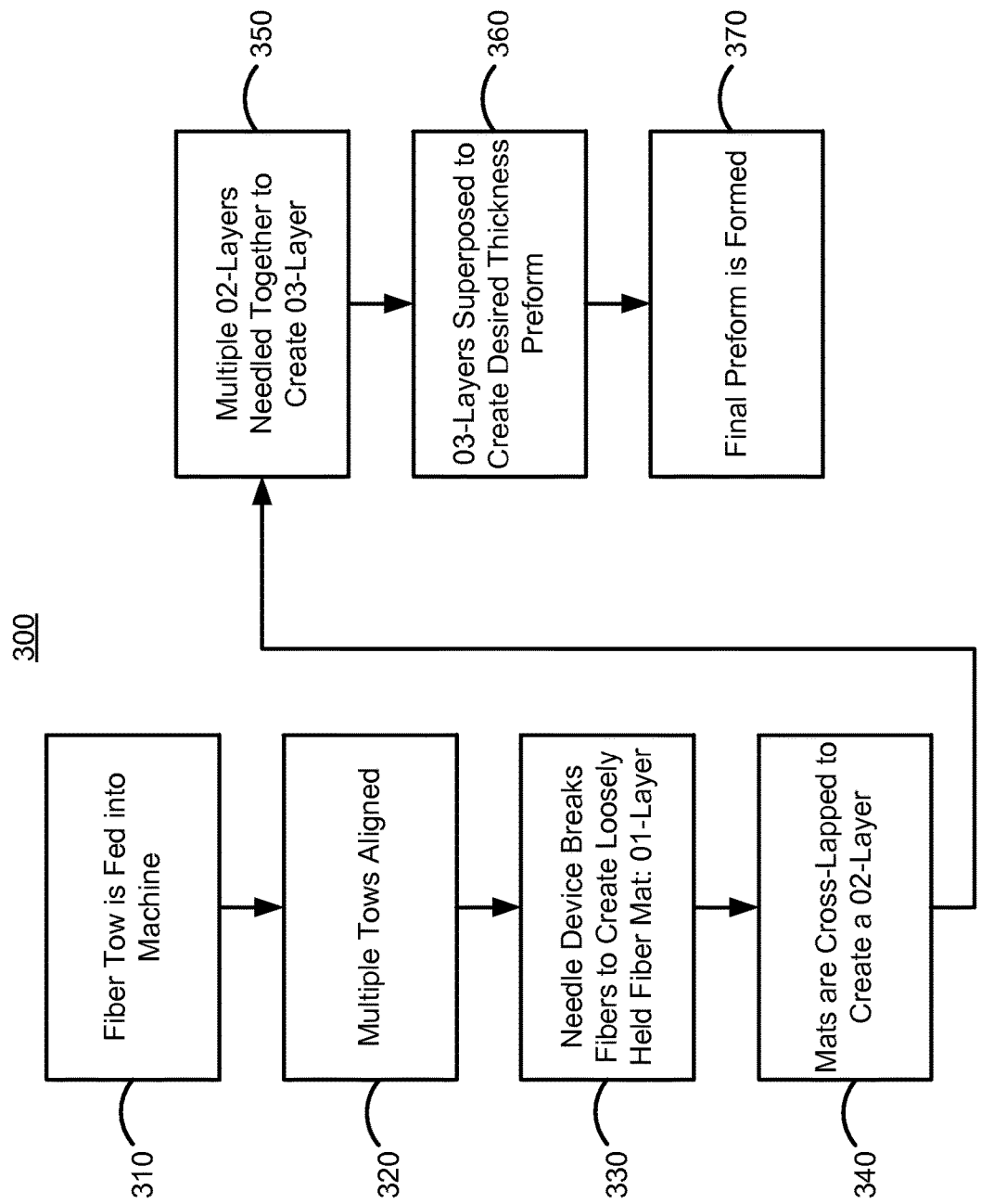
FIG. 3 illustrates a flow chart for a process of forming a fibrous preform, in accordance with various embodiments.

According to various embodiments, a process flow chart 300 of forming a low Z preform is depicted in FIG. 3. In block 310, a fiber tow of continuous filaments is utilized. At least one tow of fiber consisting of generally continuous filaments is fed into a fiber processing machine. Various fibers may be utilized for the process. For example, generally continuous, un-processed oxidized PAN fibers may be used. Such fibers consist of continuous fiber filaments that may be obtained commercially. A collection of such continuous fiber filaments is referred to as a "tow" and such a tow may have any number of filaments in it. In certain embodiments, one tow is comprised of approximately 24,000-400,000 continuous filaments. In another embodiment, one tow is comprised of approximately 320,000-400,000 continuous filaments.

In block 320, multiple tows are utilized to create a uni-directional sheet of fiber. The fiber bundles may be aligned in a common direction. In the various embodiments, the fibers are aligned in the X direction, which is also a machine direction. The horizontal fiber bundles may be disposed horizontally relative to one another and/or partially or wholly intertwined with one another in the machine direction. In various embodiments, some of the fiber bundles may be superposed on one another and aligned in the machine direction. Any number of tows may be so aligned depending on the desired thickness and height of the sheet of fiber.

In certain embodiments, as shown at block 330, the aligned fiber bundles may be processed by a first needling device. Alternatively, the fibrous layer may be held together through a number of commonly known mechanisms, such as adhesives.

The first needling device may be similar to an apparatus 8 described in FIG. 1. However, the first needling device utilized to needle the aligned fiber bundles may be used to process continuous fiber bundles. The first needling device may be disposed above the fibrous layer or uni-directional sheet of fiber as the fibrous layer is moved in the machine direction. The first needling device may also be proximal to a bobbin to wrap and/or store the fibrous layer after needling.

The needles of the needling device, similar to needles 14, may break some of the fibers within the fiber bundles to create a loosely held sheet of fiber that appears as a unidirectional mat of fibers aligned in the machine direction. Such a mat may be referred to as a "01-roll-good" and such a needling process of the aligned fiber bundles may be referred to as "01-processing". The amount of needles disposed on the first needling apparatus may be expressed as a needle density in needles per square centimeter. The first needling device may have any appropriate needle density as is known in the art.

After processing of the fiber bundles into the uni-directional fibrous layer, the fibrous layer may be stored for further processing. In a various embodiments, the fibrous layer is wrapped onto one or more transportation bobbins for further processing. Bobbins may be spiral, helical, cylindrical, or any other shape capable of allowing the fibrous layer to be wound around it. In various embodiments, the fibrous layer may be stored as a layered tape wherein the tape is flat.

At block 340, one or more additional fibrous layers or mats are superposed at an angle with the first fibrous layer oriented in the machine direction. The fibrous layer that is oriented in the machine direction is referred to as machine direction fiber mat or first fibrous layer. The at least one additional fibrous layer that is oriented at an angle to the machine direction and is superposed with the first fibrous layer is referred to as a superposed fibrous layer. Such superposition of fibers with machine direction fibers creates a layered fiber mat wherein the two or more fiber mats have a different direction of alignment. In other embodiments, the at least one superposed fibrous layer is laid down by one or more bobbins. In various embodiments, the first fibrous layer is placed in a machine direction.

The at least one additional, superposed fiber layer may then be superposed on the machine direction fiber mat and oriented at an angle to the first fibrous layer. The angle of superposition of the at least one superposed fibrous layer may be selected as necessary and changed to accommodate different fabrics, needling speeds, and final material requirements. The angle may also depend on the number of superposed fibrous layers being superposed on the first fibrous layer. Typically, the superposition angle is an acute angle between zero and 90 degrees. In various embodiments, the angle for the superposition is between thirty and seventy degrees to the machine direction.

In various embodiments, the at least one superposed fibrous layer is superposed by cross-lapping the at least one additional superposed fibrous layer with the first fibrous layer. Cross-lapping, involves laying down one or more fiber mats in a "zig-zag" pattern relative to the machine direction. The cross-lap directions may have an equivalent relative angle, or the angles may be different.

The first fibrous layer and the at least one additional, superposed fibrous layer are then sent to a second needling device which needles the fibrous layers to create a first combined fibrous mat referred to as a "02-roll-good" layer. The 02-roll good layer may then be stored for further processing by being wrapped around another transportation bobbin or laid down as a flat layered tape.

The second needling device may be a device such as the first needling apparatus. However, the density of needle punches on the second needling device is increased. In the preferred embodiment, the increased needle density at the 02-roll-good layer allows increased transport of z-fiber bundles across the fiber mats. Increasing the number of needle punches breaks up more of the X and Y direction fibers of fiber mats creating Z-fibers. Z-fibers may be needled in the Z direction by the needling-device, thereby interconnecting the fiber mats in the Z direction. Increased interconnection in the Z direction at the 02-roll-good may decrease delamination of the final preform.

According to various embodiments, the increased needle density is between approximately 55 and 65 punches per square centimeter. According to various embodiments, the increased needle density is approximately 63 punches per square centimeter.

According to various embodiments, the increased needle density is achieved by increasing the amount of needles 14 on the needling device. However, other methods of increasing the effective needle density are possible. According to various embodiments, the amount of needles 14 remains constant on the needling device as does the vertical velocity of the penetrating needles 14, but the speed with which the fibrous layers move in the machine direction under the apparatus 8 is decelerated. In this embodiment, a similar amount of needle punches per area may be obtained as increasing the number of needles 14 at a normal conveyor speed. Similarly, in further embodiments, the vertical velocity of the penetrating needles 14 may be increased while maintaining the amount of needles 14 and the speed of the fibrous layers in the machine direction constant.

At block 350, the first combined fibrous mat, or 02-roll-good layer, is superposed with at least one additional combined fibrous mat, or 02-roll-good layer. These mats are then needled together to create a fibrous three dimensional structure, or "03-board" layer. The 02-roll-good layers are superposed on the support 13 and are needled together by a third needling device.

According to various embodiments, for each needling pass, at least two combined fibrous mats, or 02-roll-good layers are placed under the needling device. According to various embodiments, for each needling pass, the first combined fibrous mat (02-roll-good layer) is superposed with at least two-additional combined fibrous mats. This allows for increased processing speeds of the material and decreases the amount of z-fibers transported between layers.

Additionally, according to various embodiments, the third needling device has a decreased needle penetration density relative to an average needle density. According to various embodiments, the decreased needle penetration density for the needling of the combined fibrous mats is between approximately 40 and 60 punches per square centimeter. According to various embodiments, the decreased needle penetration density is less than approximately 55 needle punches per square centimeter. According to various embodiments, the decreased needle penetration density is between 45 and 55 punches per square centimeter.

Increased amounts of z-fibers in the combined fibrous mats (02-roll-good layers) facilitate decreased penetration density in the 03-needling process while preventing delamination in the final preform. Similar to the 02-roll-good layer, penetration density in the 03-board layer (i.e. fibrous three dimensional structure) may be decreased by decreasing the number of needles 14 on the needling device, decreasing the vertical speed of the needle device while maintaining the machine speed of the moving textile board constant, or increasing the speed of the moving textile board while maintaining the other parameters constant.

At block 360, combined fibrous mats (02-roll-good layers) are continually superposed on support 13 to create a preform with a desired thickness. Multiple combined fibrous mats can be needled together on one another to yield a partial preform. Two or more combined fibrous mats needled with one another and having other combined fibrous mats superposed onto them, may be designated as the partial preform. In a preferred embodiment, two combined fibrous mats are added at the same time to the partial preform and needled with one another and the partial preform. The needling speed during the needling process may be adjusted between high and low speeds to incrementally under-tack and over-tack the preform. Such incremental needling speeds, rather than a constant speed, may overcome variations in the preform material such as a non-uniform distribution of z-fibers. In various embodiments, a high speed of needling at the 03-board layer ranges between 3 and 6 meters per minute (9.843 and 19.69 feet/minute). In a preferred embodiment, a low speed of needling at the 03 layer ranges between 2 and 4 meters per minute (6.562 and 13.12 feet/minute).

At block 370, the desired thickness of the preform is achieved and the final preform may be stored or shaped for further use. According to various embodiments, the preform is sculpted by a cutting device to shape the final preform into an annular shape to form a fibrous annular preform 26 (with brief reference to FIG. 4). In further embodiments, the preform is sculpted by a cutting device to shape the final preform into a circular shape. In still further embodiments, the final preform may be sculpted into any shape as required for the use of the preform.

As noted, the double layer pull of the combined fibrous mats may reduce the fabrication time of the final preform by as much as fifty percent over previously known single pull methods. In various embodiments, the speed of the combined fibrous mats traveling through the needling device increases from 1.64 meters per minute (5.381 feet per minute) to 5 meters per minute. In a various embodiments, the lower penetration density of the 03-board layers reduces the number of z-fibers transported through the different layers. In various embodiments, the annular shape final preform is utilized for brakes. In this embodiment, reduction of z-fibers facilitates reduced heat transfer to the core of the brake disk, increased heat transfer to the inner diameter/outer diameter of the brake disk, and increased performance of the brake disk during high energy friction stops. Additionally, reduced z-fiber content facilitates increased fiber volume in subsequent carbonization processing.

According to various embodiments, the fibrous three dimensional structure comprises a ratio of in-plane fibers to z-fibers. For instance, a low-z preform may have a ratio between about 4.0 to about 7.0. A known fibrous three dimensional structure, which may be referred to as DURACARB® has a ratio of about 3.0 (with respect to the carbonized preform). A fully densified C-C disk may be diluted from the effect of pyrolytic carbon which lowers the thermal edge (TE) to thermal flat (TF) to about 3.0 in a low-z preform to 2.1 in standard DURACARB®.

Figure 4:
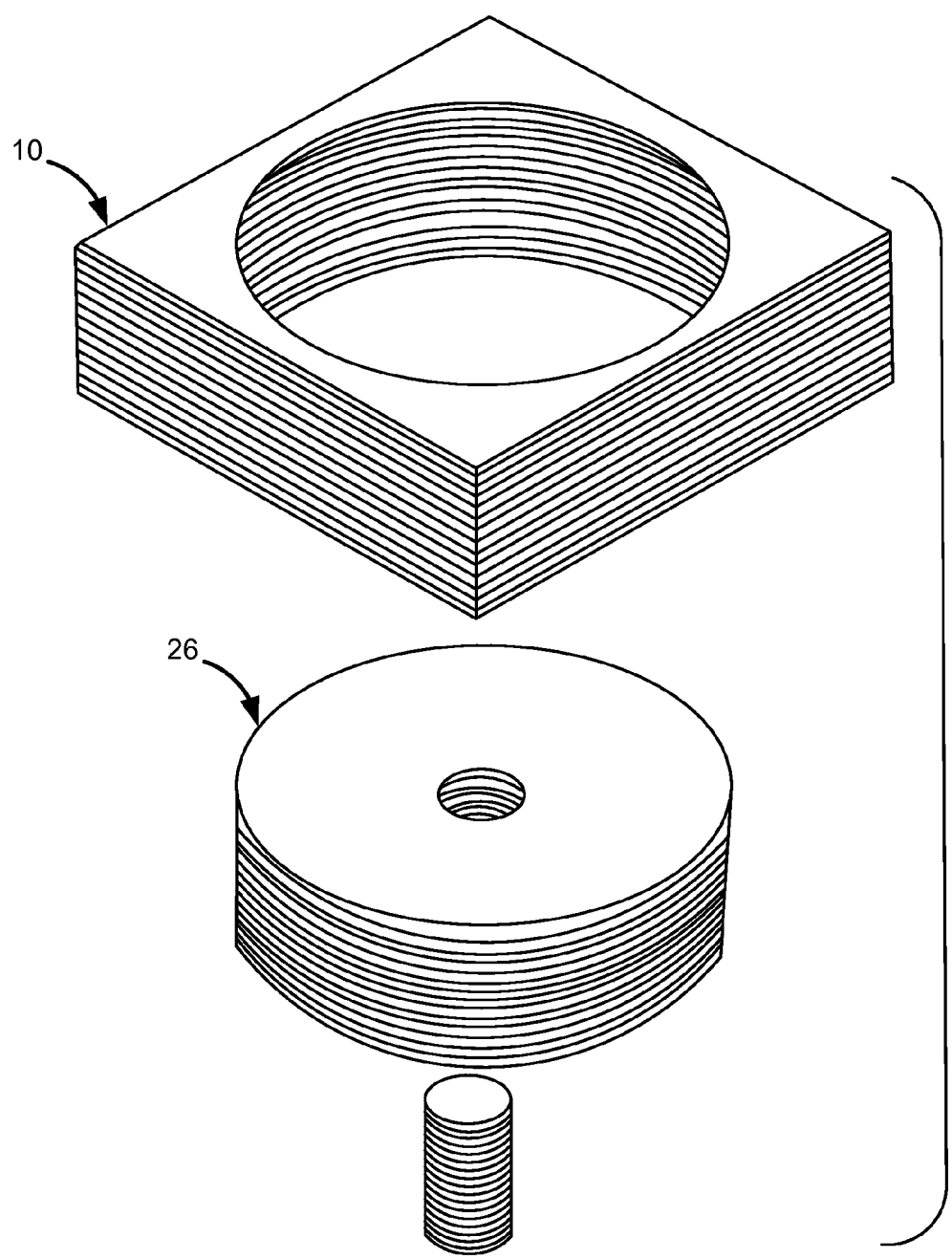
FIG. 4 illustrates in perspective view, an annular fibrous preform cut from a preform shape, in accordance with various embodiments.

As shown in FIG. 4, in response to the fibrous layers 12 being placed on the stack 44 and after the stack 44 has been needled, an annulus may be cut from the stack 44 of fibrous layers 12 to form a fibrous annular preform 26. The resulting fibrous annular preform 26 is substantially composed of PAN or OPF extending in three directions through the fibrous annular preforms 26 and pores, or open spaces, extending therethrough. In a preferred embodiment, no other materials are used in forming the fibrous annular preform 26, such as resins or the like.

Figure 5A:
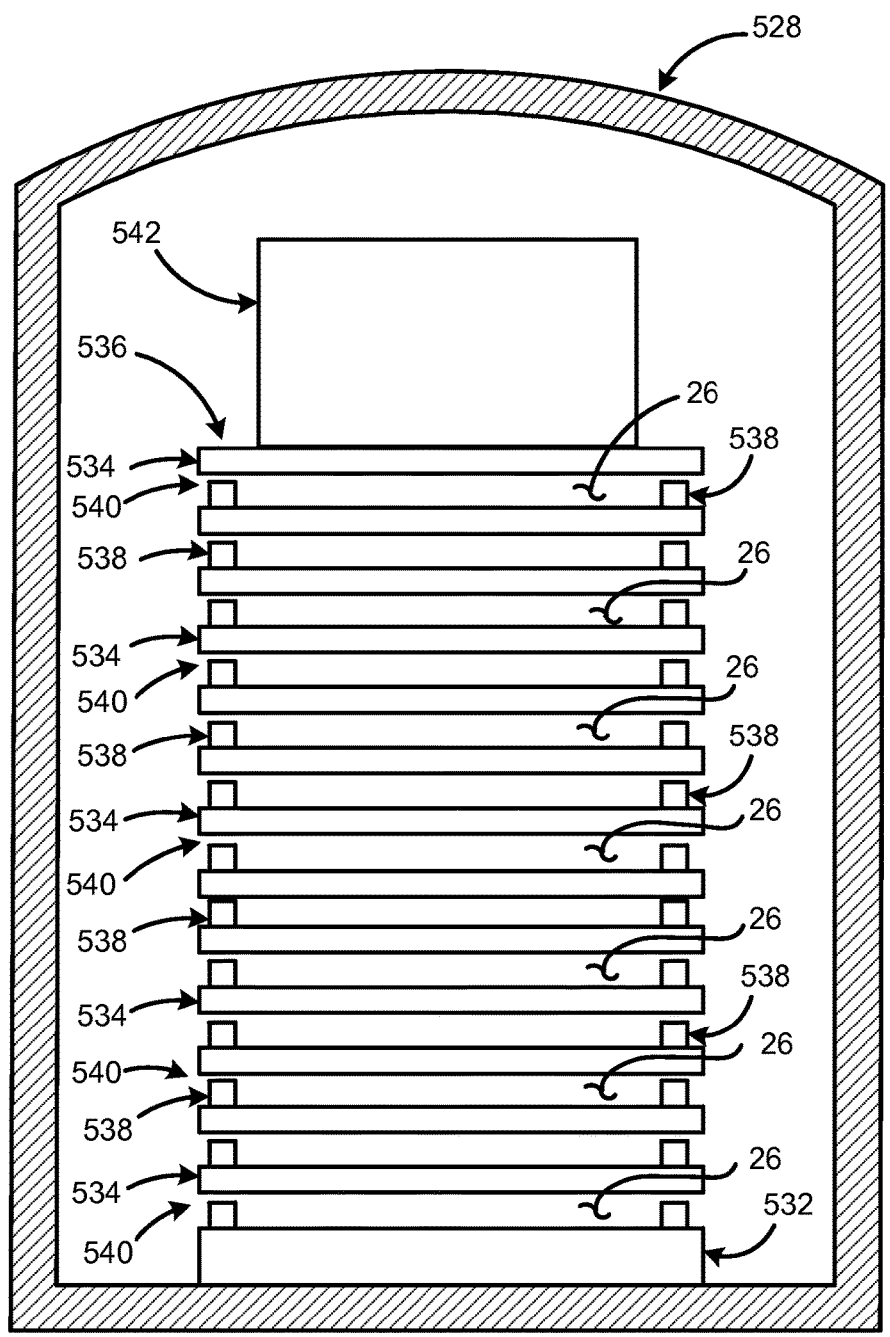
FIG. 5A illustrates a side cutaway view of an apparatus for providing compressive pressure to a stack of fibrous annular preforms during a carbonization process in a carbonization furnace, in accordance with various embodiments.

According to various embodiments and with reference to FIG. 5A, compressive pressure may be applied to the fibrous annular preforms 26 during carbonization process to increase the fiber volume ratio of the fibrous annular preforms 26 after carbonization, but without changing the z-fiber content. For example, a group of fibrous annular preforms 26 may be placed on top of each other with separator plates and spacing stops (also referred to herein as "spacers") between each fibrous annular preform 26 to form a preform stack 536. The preform stack may be transported to an oven 528. Typically, the stops are designed at a height that is less than the thickness of the fibrous annular preform 26 and defined by a target thickness of the fibrous annular preform 26. For example, the bottommost fibrous annular preform 26 may be placed on a base plate 532 at the bottom of a housing and/or oven 528. A separator plate 534 may be placed on top of the bottommost fibrous annular preform 26. Another fibrous annular preform 26 may then be placed on the separator plate 534, and another separator plate 534 may be placed on that fibrous annular preform 26. The preform stack 536 of fibrous annular preforms 26 and separator plates 534 may be constructed in this manner, with each fibrous annular preform 26 being separated from superjacent and subjacent fibrous annular preforms 26 by separator plates 534. Stops 538 which are shorter than the thickness of each corresponding OPF fibrous annular preform 26 may be placed between each of the separator plates 534. Thus, after the preform stack 536 of fibrous annular preforms 26 is constructed, gaps 540 exist between the stops 538 and adjacent separator plates 534. As described in greater detail below, mechanical pressure may applied via a dead weight 542, and/or mechanical platen press applying force until the stop 538 abuts the first plate and the second plate.

Although FIG. 5A illustrates a single preform stack 536 of fibrous annular preforms 26 in the oven 528, multiple preform stacks of fibrous annular preforms 26 could also be placed in a larger oven. Moreover, the preform stack 536 of fibrous annular preforms 26 may be constructed in the oven 28 or may be constructed outside of the oven 28 and moved into the oven 28 after construction with lifting equipment. Also, multiple fibrous annular preforms 26 may be placed between each separator plate 534 with a stop 538 to control the total thickness following carbonization. Thus, at least two fibrous annular preforms 26 may be placed between two separator plates 534 with a stop 538 positioned between the two separator plates 534. As a result, the compression is combined for multiple fibrous annular preforms 26. This may be particular useful when the fibrous annular preforms 26 have a thin thickness in the Z direction.

Compressive pressure may be provided to fibrous annular preforms 26 by placing a dead weight 542 on top of the preform stack 536 of fibrous annular preforms 26 after the preform stack 536 is constructed. Thus, the compressive pressure may be applied along the direction of the z-fibers which are formed during the needling process. Preferably, the weight of the dead weight 542 is at least 150 pounds and generates a compressive force of about 200 psi (about $1.379 \times 10^6$ newtons/square meter), but more or less may be used depending on the size of the fibrous preform 10 being compressed and the z-fiber content and resultant compressibility of the fibrous annular preform 26. The force utilized may vary with the number of fibrous annular preforms 26 of stack 536. According to various embodiments, stack 536 may be configured to generate a compressive force of between 10 and 60 psi ($6.895 \times 10^4$ and $4.137 \times 10^5$ newtons/square meter) on a fibrous preform with an OPF fiber volume ratio between about 32% and 35% fiber volume after needling. According to various embodiments, a low needling density may be desirable, such as a fiber volume ratio between 30% and 40%, or fiber volume ratio between about 32% and 35% fiber volume after needling.

Figure 5B:
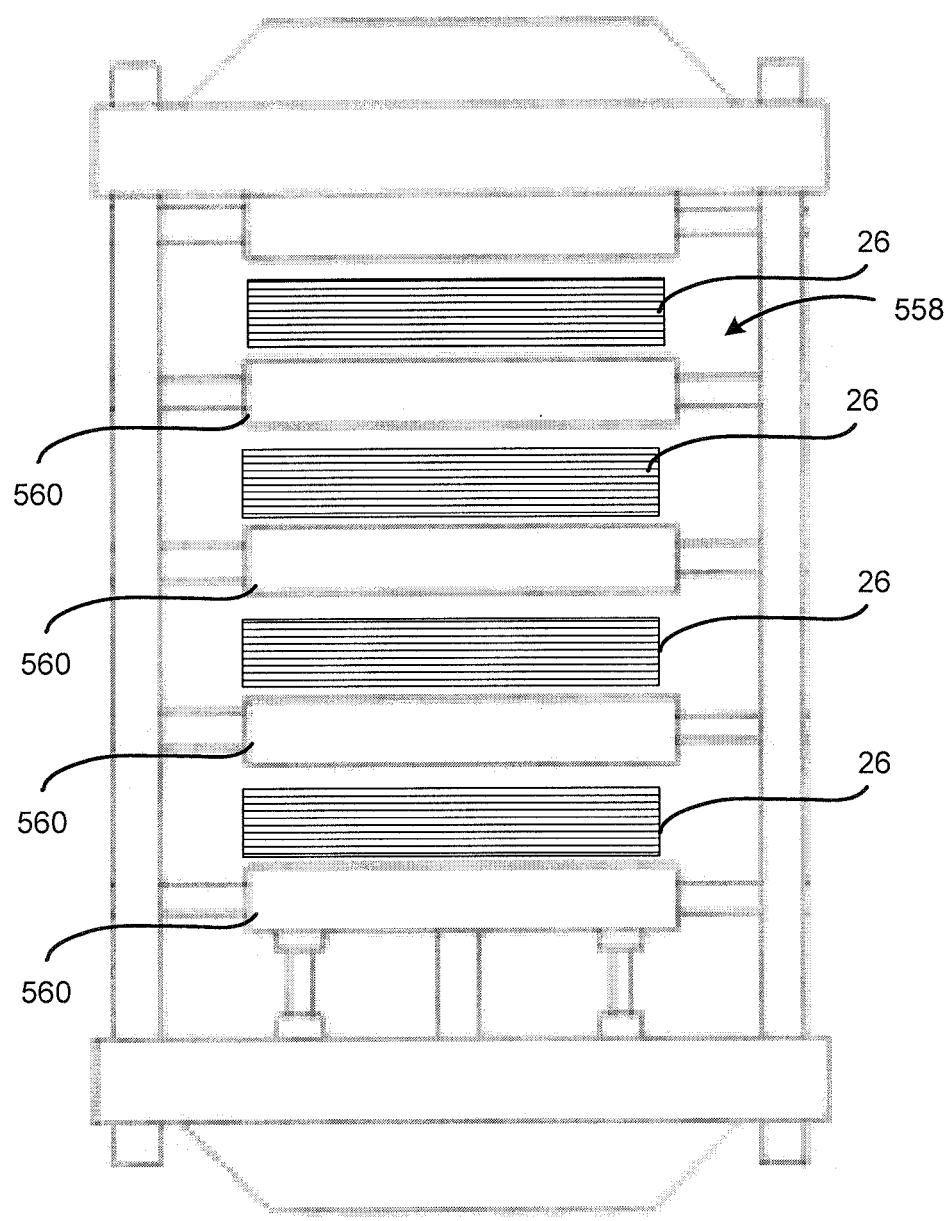
FIG. 5B illustrates a side cutaway view of a platen press for applying heat and pressure to a annular fibrous preform prior to a carbonization process in a carbonization furnace, in accordance with various embodiments.

In various embodiments, with reference to FIG. 5B, a compressive pressure may be applied to the fibrous annular preforms 26 prior to carbonization process (instead of during the carbonization process) via a mechanical press, such as press 558. As used herein prior to the carbonization process may refer to the fibrous annular preforms 26 after needling but prior to the fibrous annular preforms 26 being subject to carbonization. In various embodiments, press 558 may comprise a plurality of platens 560. Mechanical compression may be applied by press 558, compressing the individual fibrous annular preforms 26. Preforms 26 may be placed upon platens 560 within press 558. In various embodiments, one fibrous annular preform 26 is placed on each platen 560. In other embodiments, more than one fibrous annular preform 26 is placed on each platen 560. In various embodiments, platens 560 may be brought to a temperature of about 260° C. (about 500° F.) and compressive pressure may be applied. (i.e. a 200 ton ($1.814 \times 10^5$ kilograms) platen press).

Compressive force may be applied by press 558 for a predetermined cycle time. For instance, the predetermined cycle time may be between about 90 and about 180 minutes. For instance, the predetermined cycle time may be less than 3 hours. The compressive force may be measured as a pressure in psi (lb./in$^2$) applied to one fibrous annular preform 26.

Post compression, the fibrous annular preforms 26 may be transported to a furnace for carbonization. As understood by those in the art, the carbonization process converts the OPF in the fibrous annular preforms 26 into substantially 100% carbon fibers. The carbonization process is distinguished from the densification process described below in that the densification process involves infiltrating the pores of the fibrous preform and depositing a carbon matrix within the fibrous preform. In contrast, carbonization refers only to the process of converting the fibers which are used to form the fibrous annular preform 26 into carbon fibers. Although it is possible to use pure carbon fibers in the needling process, it is generally undesirable to use pure carbon fibers when forming fibrous structures using typical textile machines because of the difficulties of working with pure carbon fiber. By contrast, carbonaceous fibers like PAN and OPF, which contain carbon in addition to other compounds, have been found to be much easier to work with during typical textile techniques used to form fibrous preforms. For example, PAN and OPF are more stretchable and resilient compared to carbon fiber, and thus, are easier to use in textile machinery. PAN and OPF are also less electrically conductive than carbon fibers, which makes PAN and OPF safer to work with and less harmful to electronic components in the preform manufacturing equipment. As a result, the carbonization process allows the fibrous annular preform 26 to be formed with fibers that are not pure carbon. The fibers that are used during the forming process are then converted during the carbonization process so that the final fibrous preform prior to densification is made up of substantially pure carbon fibers.

In general, the carbonization process involves heating the fibrous annular preforms 26 in a furnace to a temperature greater than 1600° C. (2912° F.). Typically, an inert atmosphere of nitrogen and a vacuum is provided in the furnace during the carbonization process. The heat of the furnace causes a chemical conversion of the OPF which converts the fibers to carbon fibers and drives off other chemical species. Although it is preferred that the fibers in the carbonized fibrous annular preforms 26 be 100% carbon fiber, it is generally acceptable for a slightly less than full conversion to take place, and the resulting carbon fiber may be as low as 99.5% carbon.

During carbonization, the total mass and the total fiber volume in each fibrous annular preform 26 is typically reduced due to the loss of non-carbon compounds. For example, a typical fibrous annular preform 26 may lose approximately 50% of its weight during carbonization. In addition, the overall volume of the fibrous annular preform 26 typically shrinks approximately 25-30% volumetric shrinkage during carbonization. When these factors are combined, a typical OPF fibrous annular preform 26 that has a fiber volume ratio of between about 35% to 55% after the forming processes may have a fiber volume ratio of about 16% to 28% after the carbonization process.

In this example, no additional compressive pressure is applied to the fibrous preform during the carbonization processes, other than nominal pressures related to typical textile techniques, regular handling pressures, and the weight of stacked fibrous preforms and the weight of stacking hardware.

At the preform stage and after carbonization, the fibrous annular preforms 26 preferably have a structure of carbon fibers extending in three directions through the fibrous annular preform 26 and pores extending therethrough. The fiber volume ratio after carbonization is preferably about 20-24%. The fiber volume ratio may also be increased by applying compressive pressure during carbonization so that the fiber volume ratio is greater than 22% after carbonization.

Figure 6:
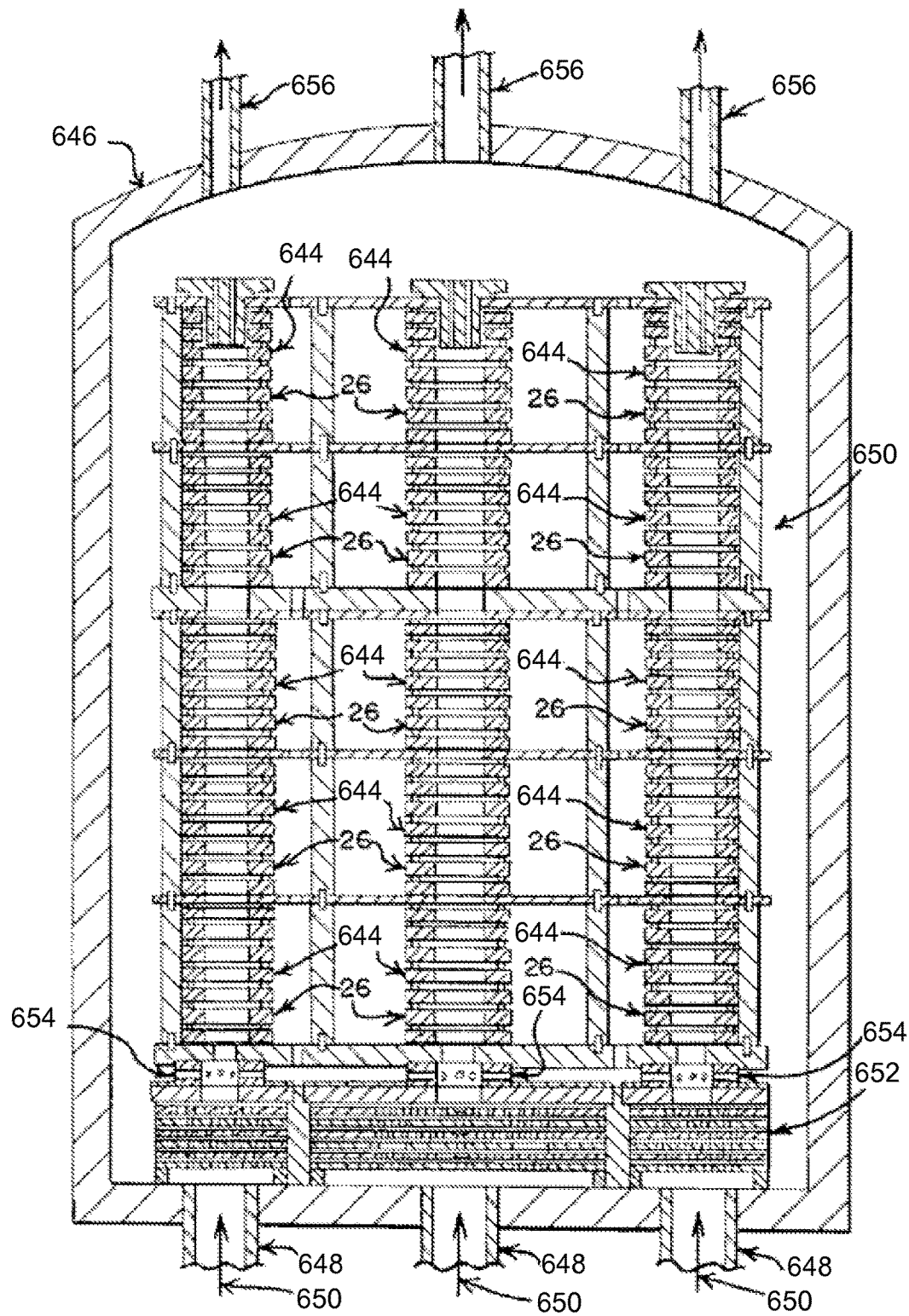
FIG. 6 illustrates a side cutaway view of a densification furnace, in accordance with various embodiments.

In response to the fibrous preforms being carbonized, the fibrous annular preforms 26 may be removed from the carbonization furnace and placed in stacks 644 in a densifying furnace with reference to FIG. 6. As well known to those in the art, the densification process deposits a carbon matrix within the pores of a fibrous preform. Many different types of densification processes may be used to densify fibrous preforms. For example, the densifying furnace is provided with inlet ducts 648 for introducing a hydrocarbon gas or mixture of gases 650 into the furnace 646, such as natural gas or propane. A preheater 652 may also be provided inside of the furnace 646 to heat the hydrocarbon gas mixture to its final temperature. Typically, a furnace temperature of about 1000° C. (about 1832° F.) is preferred for the densification process.

A distributor 654 or other arrangements and structures may be used in the furnace 646 to direct the hot hydrocarbon gas mixture around the fibrous annular preforms 26 as desired. Preferably, some of the gas 650 (e.g., the hydrocarbon gas mixture) is forced to flow through the porous structure or across the flat surfaces of the fibrous annular preforms 26. As the hydrocarbon gas mixture passes around and through the fibrous annular preforms 26, carbon breaks off from the hydrocarbon molecules and is deposited onto the carbon fibers of the fibrous annular preforms 26. The leftover gases 650 exit the furnace 646 through outlet ducts 656, and fresh hydrocarbon gases are continually supplied to the furnace 646 through the inlet ducts 648. As the densification process continues, a matrix of carbon forms within and on the fibrous annular preforms 26. As a result, the pores of the fibrous annular preforms 26 are filled or at least partially filled with carbon. When the fibrous annular preforms 26 have been densified to the desired level, the flow of hydrocarbon gases to the furnace 646 is stopped, and the densified fibrous annular preforms 26 may be removed from the furnace 646. The densified fibrous annular preforms 26 may then be cleaned, machined and further processed for their final use.

One advantage of carbon/carbon parts made by the described process is that they are especially suited for use as brake disks for large passenger jet aircrafts. When used in such applications, the described process may be used to manufacture brake disks with a higher friction coefficient then conventional carbon/carbon brake disks. For example, carbon/carbon brake disks made by the improved process described herein, the friction coefficient at RTO (i.e., "rejected take-off") may be increased as compared with conventionally processed brake disks. In addition, carbon/carbon brake disks made by the improved process may be more durable and may wear at a lower rate as compared with conventional brake disks. The demonstrated improvements are significant in that they provide opportunity for improvements in brake design characteristics, including possible weight savings, and more importantly, improvements in financial returns as a result of longer wear life. The described process is also advantageous because it is readily adaptable to present manufacturing processes without the need for significant changes to the manufacturing process or the equipment used in the process. Two representative examples are provided below for a comparison of some of the advantages of processes described above.

Figure 7:
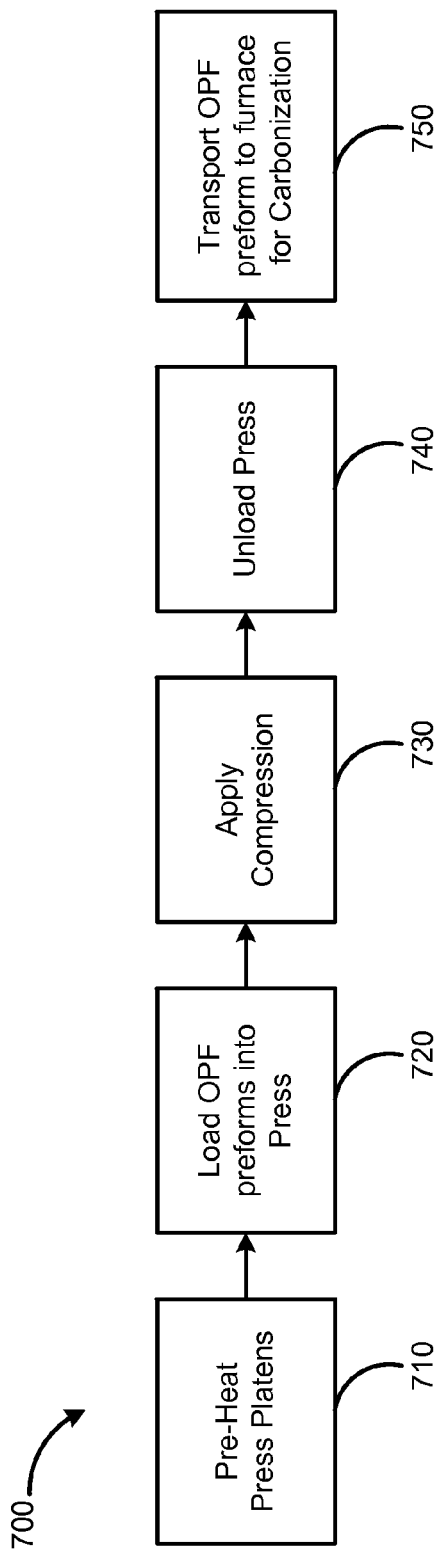
FIG. 7 illustrates a flow chart for a process of forming a fibrous preform, in accordance with various embodiments.

According to various embodiments and with reference to FIG. 7, a method 700 for forming a carbon/carbon part is depicted. A mechanical press, such as a platen, may be pre-heated (step 710). An OPF preform may be loaded into the mechanical press (step 720). Pressure may be applied to the OPF preform at an elevated temperature (Step 730). The OPF preform may be removed from the mechanical press (step 740). The OPF preform may be transported to a furnace. The OPF preform may be carbonized in the furnace at a higher temperature than the elevated temperature (Step 750).

Figure 8:
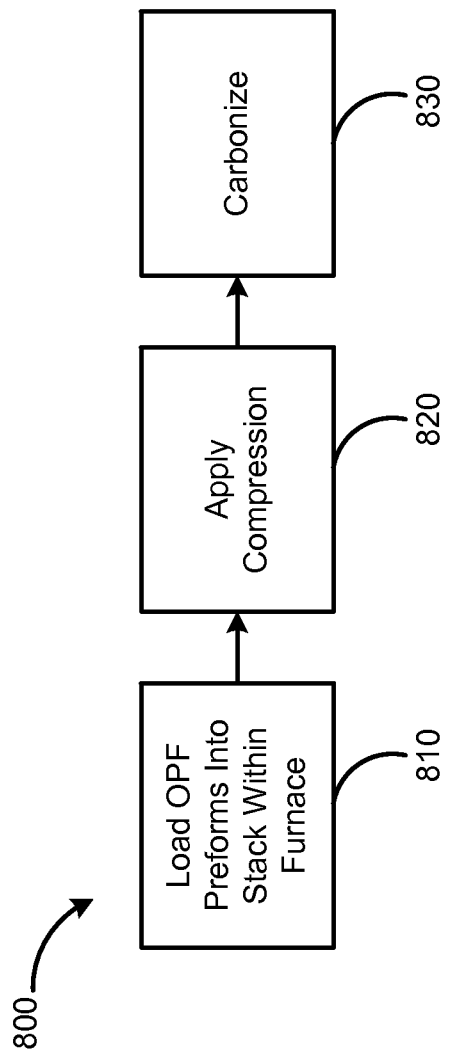
FIG. 8 illustrates a flow chart for another process of forming a fibrous preform, in accordance with various embodiments.

With reference to FIG. 8, a method 800 in accordance with various embodiments for forming a carbon/carbon part is depicted. A plurality of OPF preforms may be loaded into a stack within a furnace (step 810). Pressure may be applied to the OPF preforms at an elevated temperature below the carbonization temperature (Step 820). The OPF preforms may be carbonized at the carbonization temperature within the furnace (Step 830).

Although described with reference to specific methods (e.g., methods 700 and 800), any manner of compressing and carbonizing preforms (such as OPF preforms) to achieve a final fiber volume ratio of between about 20% fiber volume and 24% fiber volume is within the scope of the present disclosure.

Additionally, benefits, other advantages, and solutions to problems have been described herein with regard to various embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, and C" or "at least one of A, B, or C" is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

As used herein, the singular forms "a," "an," and "the" include plural referents unless the context clearly dictates otherwise. As used herein, the terms "for example," "for instance," "such as," or "including" are meant to introduce examples that further clarify more general subject matter. Unless otherwise specified, these examples are embodiments of the present disclosure, and are not meant to be limiting in any fashion.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method for forming a fibrous preform comprising:
    superposing a first fibrous layer aligned in a machine direction with an additional fibrous layer aligned in an acute angle to the machine direction;
    needling the first fibrous layer and the additional fibrous layer together at a needle density of between approximately 60 and 65 needle punches per square centimeter to form a first combined fibrous mat;
    superposing an additional combined fibrous mat with the first combined fibrous mat;
    needling the first combined fibrous mat and the additional combined fibrous mat at a needle density of between approximately 45 and 55 needle punches per square centimeter to form the fibrous preform comprising oxidized polyacrylonitrile (OPF) fibers extending in multiple directions and having pores extending therethrough, wherein a fiber volume ratio of the fibrous preform is between about 30% fiber volume and about 35% fiber volume;

compressing the fibrous preform; and carbonizing the fibrous preform by heating the fibrous preform to convert fibers of the fibrous preform into carbon fibers, wherein the fiber volume ratio of the fibrous preform after the carbonizing is between about 20% to 24% fiber volume.

2. The method of claim 1, wherein the step of compressing the fibrous preform comprises applying a mechanical pressure to the fibrous preform during carbonizing to compress a thickness of the fibrous preform.

3. The method of claim 1, wherein the step of compressing the fibrous preform comprises applying a mechanical pressure to the fibrous preform prior to carbonizing to compress a thickness of the fibrous preform at a temperature less than 200° C.

4. The method of claim 1, further comprising densifying the fibrous preform by depositing a carbon matrix within at least a portion of the pores.

5. The method of claim 1, wherein the additional fibrous layer is oriented at an angle between 30 degrees and 70 degrees to the machine direction.

6. The method of claim 1, wherein the step of superposing comprises superposing at least two additional fibrous layers with the first fibrous layer at two separate acute angles to the machine direction.

7. The method of claim 1, wherein the first fibrous layer is needled prior to the superposing with the additional fibrous layer.

8. A method for forming a fibrous preform comprising:

needling a first fibrous layer and an additional fibrous layer together at a needle density of between approximately 60 and 65 needle punches per square centimeter to form a first combined fibrous mat;

needling the first combined fibrous mat and an additional fibrous mat at a needle density of between approximately 45 and 55 needle punches per square centimeter to form the fibrous preform;

applying mechanical pressure to the fibrous preform prior to a carbonization step to compress a thickness of the fibrous preform and thereby increase a fiber volume ratio of the fibrous preform; and carbonizing the fibrous preform by heating the fibrous preform in a furnace to convert the fibers into substantially carbon fibers, wherein the fiber volume ratio of the fibrous preform after the carbonizing is between about 20% and 24% fiber volume.

9. The method of claim 8, wherein the mechanical pressure is applied at less than 200° C.

10. The method of claim 8, wherein the mechanical pressure is applied for between 90 minutes and 180 minutes.

11. The method of claim 8, wherein the mechanical pressure is applied along a direction of a plurality of z-fibers via a mechanical platen press.

12. The method of claim 11, wherein the mechanical platen press generates a compressive force of between 10 lbs/in$^2$ (psi) and 60 psi on the fibrous preform.

13. The method of claim 8, further comprising densifying the fibrous preform by depositing a carbon matrix within at least a portion of pores of the fibrous preform.

14. The method of claim 8, wherein at least one of the first fibrous layer and the additional fibrous layer comprises oxidized polyacrylonitrile (OPF).

15. The method of claim 8, wherein a fiber volume ratio of the fibrous preform before applying the mechanical pressure is between 30% fiber volume and 35% fiber volume.

* * * * *